United States Patent
Shen et al.

(10) Patent No.: US 10,310,843 B1
(45) Date of Patent: Jun. 4, 2019

(54) SOFTWARE VERSIONING

(71) Applicant: Wells Fargo Bank, N.A., San Francisco, CA (US)

(72) Inventors: Peter L. Shen, Castro Valley, CA (US); Catherine Li, Corte Madera, CA (US); Chandramouli Balasubramaniam, Dublin, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 15/864,446

(22) Filed: Jan. 8, 2018

Related U.S. Application Data

(63) Continuation of application No. 14/714,674, filed on May 18, 2015, now Pat. No. 9,891,906.

(60) Provisional application No. 62/098,909, filed on Dec. 31, 2014.

(51) Int. Cl.
   *G06F 9/44*     (2018.01)
   *G06F 8/65*     (2018.01)
   *G06Q 40/02*    (2012.01)

(52) U.S. Cl.
   CPC ............... *G06F 8/65* (2013.01); *G06Q 40/02* (2013.01)

(58) Field of Classification Search
   None
   See application file for complete search history.

(56) References Cited

U.S. PATENT DOCUMENTS

| | | |
|---|---|---|
| 6,311,321 B1 | 10/2001 | Agnihotri et al. |
| 6,460,089 B1 | 10/2002 | Romano et al. |
| 6,487,594 B1 | 11/2002 | Bahlmann |
| 6,892,234 B2 | 5/2005 | Knight |
| 7,409,463 B2 | 8/2008 | Ramachandran |
| 7,895,572 B2 | 2/2011 | Stienhans |
| 8,024,743 B2 | 9/2011 | Werner |
| 8,239,851 B2 | 8/2012 | Laicher et al. |
| 8,370,924 B2 | 2/2013 | Mason et al. |
| 8,473,743 B2 | 6/2013 | Freedman et al. |
| 8,474,015 B2 | 6/2013 | Jaber et al. |
| 8,556,713 B2 | 10/2013 | Pilip |
| 8,620,819 B2 | 12/2013 | Walker et al. |
| 8,656,508 B2 | 2/2014 | King et al. |
| 2003/0115311 A1 | 6/2003 | Johnston-Watt et al. |
| 2007/0250831 A1 | 10/2007 | Spotswood |
| 2009/0055157 A1 | 2/2009 | Soffer |
| 2011/0252360 A1 | 10/2011 | Wheeler et al. |
| 2012/0131467 A1* | 5/2012 | Kemmler ............ G06F 8/38 715/734 |
| 2013/0103816 A1 | 4/2013 | Morley et al. |
| 2013/0298185 A1 | 11/2013 | Koneru et al. |
| 2014/0297636 A1* | 10/2014 | Kitajima ........ G06F 17/30557 707/736 |

\* cited by examiner

*Primary Examiner* — Qamrun Nahar
(74) *Attorney, Agent, or Firm* — James J. Pingor

(57) ABSTRACT

Provided is software versioning that allows a set of features to be selectively enabled and/or disabled based on a value of a switch associated with each feature of the set of features. The software versioning includes an administrator component that receives a change to a switch associated with at least one application. A toggle component generates a configuration notice based on an indication of the change to the switch. A tool kit component facilitates implementation of the change at the application based on the configuration notice received from the toggle component.

20 Claims, 14 Drawing Sheets

SOFTWARE VERSIONING

CROSS REFERENCE

This application claims priority to U.S. Non-Provisional patent application Ser. No. 14/714,674 entitled "SOFTWARE VERSIONING" filed on May 18, 2015, which claims the benefit of Provisional Application Ser. No. 62/098,909, filed Dec. 31, 2014, entitled "SOFTWARE VERSIONING AND STRATEGY BASED FEATURE DISABLEMENT," the entirety of both applications are expressly incorporated herein by reference.

BACKGROUND

Online banking provides customers with the ability to interact with their bank on their own schedule, providing convenient access to a range of banking services. Integrated business functionality across many enterprise application platforms is being introduced at a record pace. At the same time, technology ecosystem has become increasingly more complex as a result of smart device proliferation.

The ability to finely control the enablement (or disablement) of these business functions across all these platforms is cumbersome, complex, and prone to manual errors when coordinating all the systems involved. Additionally, there may be a high cost associated with such management.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

An aspect relates to a system that comprises a toggle component that contains a switch definition for a switch used by at least one application. The system also includes an administrator component that receives a change to a switch value. The toggle component updates the switch definition to reflect the change to the switch value. The system may also include a tool kit component that receives, from the toggle component, the change to the switch value and implements the change to the switch value at the at least one application. The tool kit component is a library associated with the at least one application. The application should be able to access the switch values from the toggle component.

A further aspect relates to a method that may include receiving, by a system comprising a processor, a value for a configuration defined for a switch. The switch is used by a first application. The method may also include conveying, by the system, the value for the switch to the first application and updating, by the system, a first internal configuration of the first application based on the value.

Still another aspect relates to a computer-readable storage device storing executable instructions that, in response to execution, cause a system comprising a processor to perform operations. The operations may include establishing a value for a switch. The switch is used by a first application. The operations may also include conveying the value to the first application and updating an internal configuration of the first application based on the value. The internal configuration may be managed by one or more servers associated with the first application. Further, the operations may include receiving a confirmation from the first application that the internal configuration of the first application is updated.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

One or more aspects disclosed herein relates to enterprise intelligent software versioning that may control software behaviors dynamically. According to some implementations, the behaviors may be configured by impromptu business decisions due to the volatile nature in market, risk, and regulatory environments.

Figure 1:
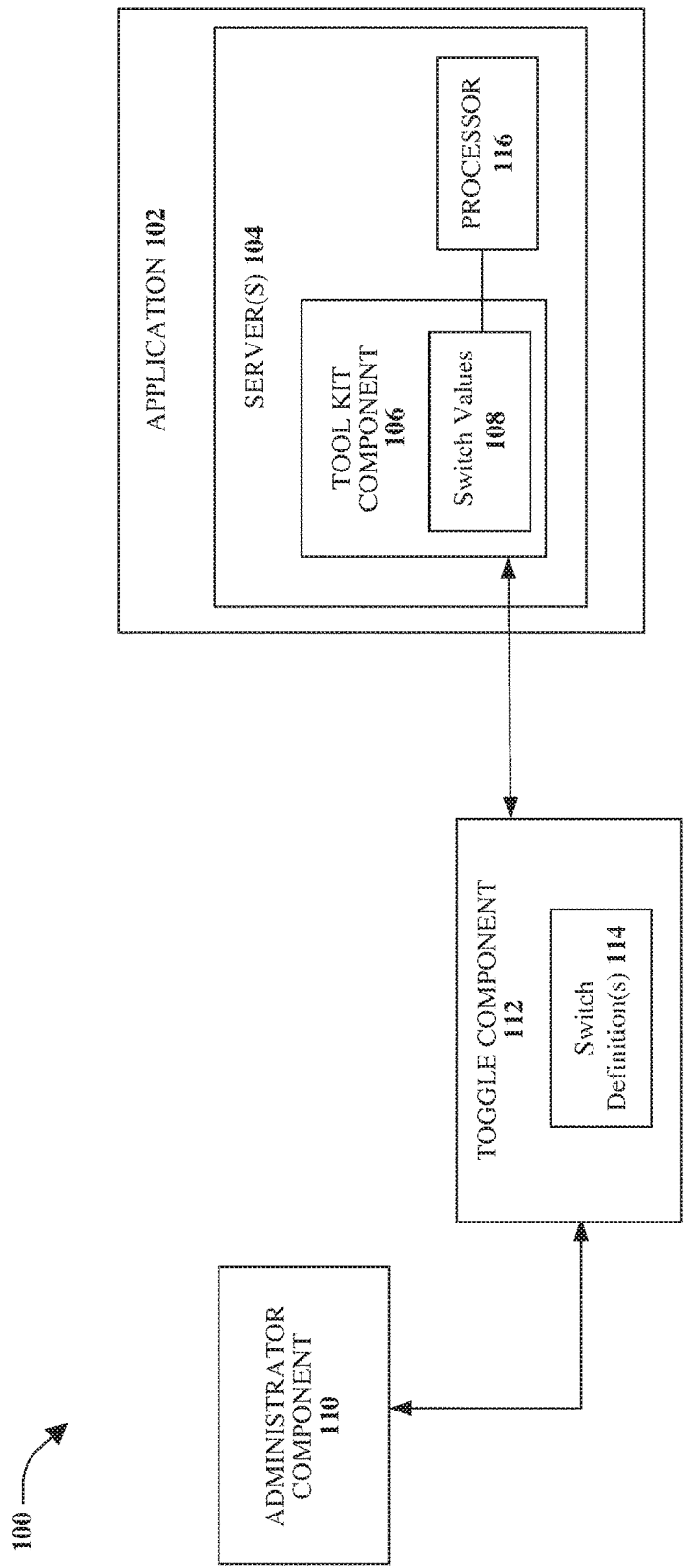
FIG. 1 illustrates an example, non-liming implementation of a system configured for software versioning, according to an aspect.

FIG. 1 illustrates an example, non-liming implementation of a system 100 configured for software versioning, according to an aspect. In a web-based application environment, such as a software environment, there is a multitude of applications. For purposes of simplicity, only a single application 102 is illustrated and described herein, although more than one application may be included in an application environment.

The application 102 may include one or more servers 104 and a tool kit component 106. The tool kit component 106 is a software library that is linked or bundled with the application 102. At runtime, the tool kit component 106 runs inside a memory associated with the application 102. The tool kit component 106 may retain one or more switch values 108 for switches used by the application 102. According to some implementations, a first application and a second application (or subsequent applications) may use (or share) the same switch; however, the first application and the second application might not be related or might not be dependent on each other. In accordance with another implementation, a first application and a second application may have a dependency relationship, as will be discussed in FIG. 2 below.

Features of various software products (e.g., the application 102) may be toggled on/off based on the switch values retrieved from the toggle component 112. The switch values may be changed through a graphical console (e.g., an administrative console, illustrated as an administrator component 110 in FIG. 1). A feature may be a functional component, a project, a product line, and so on. The console (e.g., the administrator component 110) may show dependent toggles, which may be navigated to as a second level toggle (e.g., dependent applications), which will be discussed with respect to FIG. 2 below.

The administrator component 110 may be a web-based application that communicates with a toggle component 112. The administrator component 110 may be configured to allow production operators to change switch definitions or switch values at run time. Further, the administrator component 110 may be configured to provide a read-only version for all other users (e.g., product managers, technical support, technical managers, and so on) that are interested to learn the current switch values for a given application. For example, the administer component 110 may be configured to assist production operators to maintain all the switch configurations and values for the registered applications inside the toggle component 112. The administrator component 110 may be a graphical user interface (GUI) that is utilized for an operator to manipulate the switch values. Thus, the administrator component 110 may be a tool for an operator to access the contents of the switch configuration in the toggle component 112. Further, the administer component 110 may be configured to allow read-only operators or users the ability to view switch definitions 114 for each switch and/or each application without making changes.

In an implementation, notifications (e.g., a change of switch value) may be sent from administrators (e.g., through the administrator console 110) to the toggle component 112. The toggle component 112 may retain at least one switch definition 114 for switches used by all applications, including the application 102. The toggle component 112 may be also referred to as a switch server, wherein features for this switch server are centralized. The switch definition 114 may define the application, the application environment, different releases or versions, and other data.

At about the same time as receiving the update from the administrator component 110, the toggle component 112 may notify all affected platforms (such as the application 102) when a feature (or a switch associated with the feature) is toggled, or a value is changed.

For example, when a new feature (e.g., the application 102, a change to the application 102, and so on) is provided (through the administrator component 110), in a first installation or a first implementation (e.g., first few weeks or months), the new feature may only be provided to a limited number of end users. This is the initial state of the switch definition 114, which is received by the application 102 during the implementation time of the application 102. After the first implementation period, the feature may be available for all end users, or a subset thereof. Thus, a value change to the switch definition 114, which is performed through the administrator component 110, may be implemented. The change may be sent from the toggle component 112 to the tool kit component 106; hence, the switch value 108 is changed. This change may affect a processing logic change in a processor 116 associated with the application 102 and/or the server 104.

For example, during the first implementation period, the feature may be available only to customers in California; during a second implementation period, the feature may be available to customers West of the Mississippi River; and during a subsequent implementation period, the feature may be available to all customers located within the United States of America. It is noted that although various examples are discussed with respect to geographical restrictions, the disclosed aspects are not so limited. Instead, other criteria may be utilized as will be discussed herein.

To coordinate the one or more implementation periods or rollouts, conventional systems use manual input to change each of the multiple servers (e.g., the one or more servers 104). This is cost inefficient in terms of resources, including both labor and time. Further, in the case where there is more than one rollout period, the same process of adding additional or different criteria at each of the multiple servers (e.g., the one or more servers 104) has to be repeated, consuming more resources. For example, a change to the switch value 108 has to be applied at each server (e.g., at the one or more servers 104).

In order to overcome the deficiencies of manual changes, the disclosed aspects employ new system components that provide an automatic switching environment. Through utilization of these new system components, only a single input is necessary and that single input is distributed automatically to each of the multiple servers (e.g., the one or more servers 104). Thus, when a confidence level related to a new feature rollout is reached, the new feature may be made available to more end users or to all end users, may be selectively disabled, may be changed, and so forth. The changes or updates may be realized through the addition of a switch. The switch includes data indicative of a value (or multiple values) that indicates one or more implementation rule(s). Further, the automation is not only applied to a given switch within a single application (e.g., feature or service), but may also apply to applications that have dependencies on the switch in the situation where there is layering among applications. Thus, the disclosed aspects may also facilitate an improvement to the functioning of a computer system itself.

In an example, the switch definitions 114 may be initiated by the administrator component 110 (e.g., admin console). Automation may occur when the changes are dynamically retrieved by the application 102 through a client tool kit component (e.g., the tool kit component 106), for example. At about the same time as at least one switch definition of the switch definitions 114 changes (or at some time thereafter), the application 102 may obtain the respective change through the tool kit component 106. The obtained change can lead to the logic changes in the processor 116.

As illustrated, the tool kit component 106 contains the switch value(s) 108 at the application startup from the toggle component 112. The processor 116 of the application 102 may have pre-programmed business logic that supports various switch values. Once the switch value 108 changes, the business logic that resides in the processor 116 executes accordingly.

In an example, a switch may be related to (or may define) a location (such as a state or city) where an application is available and a switch definition may be a location or state code (or multiple state codes). Further to this example, an application may be implemented first in Arizona and, therefore, an initial value of the switch is Arizona. Thereafter, the application may be rolled out to Utah and New Mexico. Therefore, a subsequent value(s) for the switch may be Arizona, Utah, and New Mexico.

In another example, an application may be first provided the new feature to users having less than $1,000 in their banking account. Therefore, the initial switch value may indicate the account should have less than $1,000. Thereafter, a second switch value may indicate that the account should have less than $5,000. Then, customers with account balances less than $5,000 would see the new feature. Later a third switch value may indicate that accounts should have less than $10,000, where customers with account balances less than $10,000 would see the new feature, and so on.

Although discussed with respect to a geographic location or a monetary value, the switches may relate to other parameters. For example, each customer of a financial entity may have a unique identifier and an application may focus on certain customers, based on respective unique identifiers. Thus, the switch may be related to the customer identifier and the value may be a range of identifiers or specific identifiers. Thus, when an identified customer interacts with (e.g., logs on to) an application that has a matching customer identifier value in the switch, that customer will receive the new functionality related to the application, for example.

In another example, the switch may be related to a product, wherein each product may have a different product code. For example, a checking account may be a demand deposit account that includes a multitude of sub-product codes. A certain type of checking account may have access to a new feature. Thus, the value of the switch includes the product code for the certain type of checking account. Over time, the new feature may be implemented on other types of checking accounts (or other types of financial accounts) automatically by the various aspects discussed herein.

The initial value of the switch may be tracked by the toggle component 112. When the initial value is changed to a subsequent value, the toggle component 112 may update the value of the switch definition 114. The change to the switch value may be received by the tool kit component 106 that is running on the application 102.

Further, the tool kit component 106 receives the change notification from the toggle component 112. The changed switch value 108 may trigger the implementation in the processor 116, where a change is to transition from rolling out a feature to two additional locations, the switch value may change from "0" to "1," for example.

The tool kit component 106 may be bundled inside the application 102, which is deployed on all instances of the server 104. At about the same time as a change notification is received from the toggle component 112, the change(s) may be reflected across all servers 104 within the application 102. Examples of applications include, but are not limited to, internet baking applications, web services applications, web-based applications, and so on.

In the case where two or more application utilize the same switch, but do not have a dependency relationship, the changes may be implemented simultaneously (or nearly at the same time) across all the applications that utilize the switch. Thus, the toggle component 112 may communicate with each of the two or more applications to implement the changes at each application in parallel.

In an example, at implementation time for the application 102, a new switch should be defined for the application and implemented in the application 102 (e.g., the switch has different logic stored inside the processor 116). The switch definition 114 is communicated to the toggle component 112 by the administrator component 110 and retained in the toggle component 112. The switch definitions 114 may be retained in the toggle component 112 in a software format and at runtime are loaded into the corresponding application memory.

On the application side, each application may have multiple physical servers (e.g., different instances). Each instance (e.g., each server 104) has a tool kit component 106 bundled in with (which is also in its memory). The switch value 108 may be the initial switch value, which is loaded at application start-up. Then, the application 102 pulls (or the toggle component 112 may push) the switch definition 114. Once the value is received by the tool kit component 106, the processor 116 may request the value of the switch continuously, periodically, or at other defined or random intervals. The processor 116 has different branching logic (e.g., business logic), such as switch value on, switch value off, switch value certain range, and so forth.

Figure 2:
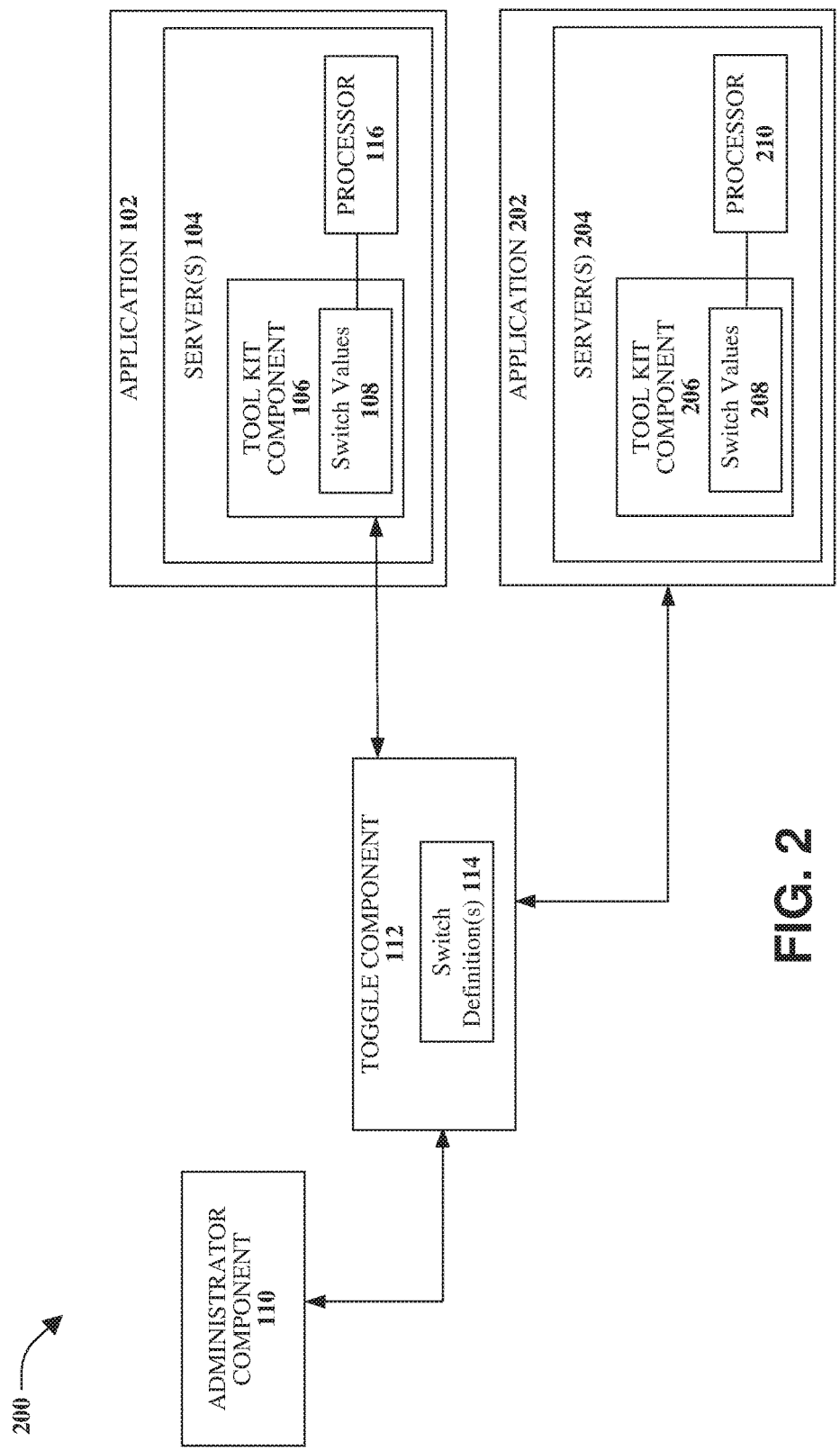
FIG. 2 illustrates an example, non-limiting representation of another system configured for software versioning, according to an aspect.

FIG. 2 illustrates an example, non-limiting representation of another system 200 configured for software versioning, according to an aspect. In this figure, at least a second application 202 is included and has a dependency relationship with the first application 102. The second application may include one or more servers 204 and a tool kit component 206. The tool kit component 206 may maintain one or more switch values 208 for switches utilized by the second application 202. For the same switch, the switch value 108 and the switch value 208 are the same value. Further, the second application 202 includes a processor 210 that may implement the changes to the switch values 208.

According to various implementations, each of the first application 102 and the second application 202 may have at least two switches. For example, the first application 106 may include a set of switches and the second application 202 may include a set of switches. At least one of the switches may be utilized to control the new feature associated with the respective application. Further, at least one of the other switches may be utilized to control one or more elements of the application (or feature associated with the application), as discussed herein.

According to some implementations, one or more applications may have a relationship with another application. For example, the second application 202 may depend on the first application 102 (or alternatively, the first application 102 may depend on the second application 202). Thus, the applications could have a master-slave relationship. The first application 102 may register with its tool kit component 106 and the second application 202 may register with its tool kit component 206 to the toggle component server 112. Once both applications register, the relationship between the applications will be known by the toggle component 112, wherein one application is the master application and the other application is the slave application. Thus, when a switch for one application, such as the mater application changes, the change is also reflected in the slave application. The switch changes across the applications having relationships or dependencies may also be facilitated through messages, as will be described in further detail below.

In operation, during runtime for example, a value of a switch may need to be changed. In an example where the switch relates to a location or state code, the initial value might be California. Then, after a few weeks or other time interval, Oregon and Nevada might be added. Thus, the value of the switch is changed at the administrator component 110, the toggle component 112 receives the change and conveys the update to the tool kit component 106 of the first application 102 (the master application in this example). For example, the toggle component 112 may convey a configuration notice to the first application 102 (e.g., the tool kit component 106). The configuration notice may include various data including data indicative of a switch, a switch definition, and a switch value.

The tool kit component 106 may facilitate implementation of the change at the first application 106, based on the configuration notice. For example, the toggle component 112 notifies the application 102 and provides the switch definition 114. At about the same time as the first application 102 receives the value definition 114, one or more switch values 108 are updated, and the processor 116 implements the changes. Thus, the existing logic may be changed dynamically, without manual changes needing to be made at each server.

In an example where there is a dependency type (e.g., master-slave) relationship between applications, at about the same time as the master application (e.g., the application 106) receives the new value and deploys that value to its servers (or at a time thereafter), a notification is transmitted to the toggle component 112. The notification indicates that the changes have been made at the first application 102 (e.g., a confirmation is received by the tool kit component 106). When there is a dependent application (e.g., the second application 202), the toggle component 112 may send another configuration notice based on a determination that the application is dependent on another application. The other configuration notice may include various data including the data indicative of the switch, the switch definition, and the switch value. With the information received in the other configuration notice, the toggle component 112 may then send a notification to the other (e.g., dependent) application 202 indicating the switch definition 114. The other application 202 receives the switch definition 114 and one or more switch values 208 of the tool kit component 206 are updated. Thus, the new or updated logic is automatically implemented on the other, dependent application.

The master-slave (or master-client) relationship may be determined (by the toggle component 112) based on the relationship between two (or more) applications. For example, for on-line banking applications a customer logs onto the application. A feature in the application may include obtaining data from a second application (e.g., a middleware services application). The feature of the first application and the data provided by the second application may have different logic based on the same switch. At about the same time as the switch value changes, the second application that provides the data should have the logic changed first, before the first application logic changes to the new switch value. Therefore, the master (e.g., the services application) and the client (e.g., the on-line banking application) relationship is needed for the switch value change.

In some implementations, the value of the switch may be a negative value to represent the end state of the switch. In a simple location example, the value of the switch may indicate that customers (or end users) in the named location do not receive the feature. According to some implementations, a negative value represents a default behavior, which can be utilized to represent that no switch is needed. For example, when an application or feature is deployed by different geographical areas, the first implementation may be within one state. A few months later, the feature may be expanded to customers in two or three states. Once the feature is deployed nationwide, instead of listing all the zips codes, a negative number may be used in order for the feature to default to all customers.

According to some implementations, the toggle component 112 may be configured to automatically change a value of at least one switch based on defined criteria. In one example, the defined criteria may be related to a timing. For example, for the first 3-months of implementation of an application the switch value may be a first value, for the second 3-months the switch value may be a second value, for the third 3-months the switch value may be a third value, and so on. Each of the first value, second value, third value, and subsequent values may be different values. The timing information may be monitored by the toggle component 112, which automatically controls and implements the changing values through interaction with other system components. Further, although discussed with respect to time, the enactment module may use other criteria to automatically change the switch value. Such criteria may include a quantity of end users using the application, a dollar value, a debt value, or another quantitative value.

In addition, the toggle component 112 may be configured to disable (e.g., turn off or deactivate) one or more of the switches and/or revert one or more switches to a previous switch value (or to an initial value) based on an indication that the feature should be disabled. For example, a feature for an application might be deployed and, after use of the feature, it might be determined that the feature may cause potential damage and/or there is a fraud concern. Such information may be received based on customer feedback, internal monitor logs, or based on other observations.

The potential damage and/or fraud concern might be triggered by an event internal to the system or an event that occurs external to the system. Based on the determination that the switch value should change, revert to a previous or initial value, or be shut off (e.g., deactivated), the toggle component 112 may be configured to notify the first application 102, or another system component such as the tool kit component 106. Based on this notification (or a similar notification), the switch value change or complete disablement of the switch may be implemented at the application.

A similar process may be performed by the toggle component 112 for any dependent applications (e.g., the second application).

An application may be a stateless application. A stateless application is an application program that may not record data generated during a session. For example, information about a current session (e.g., user settings, events, and so on) is not recorded for use in a next session.

Thus, the manner of setting the switch and/or building logic for the switch value change may be different as a function of the application type. Further, the disclosed aspects are not limited to digital channel applications, but may be utilized for other products or lines within a financial institution or other entity.

In an example, there may be various types of switches, which may include, but are not limited to, fraud control, release of risk communications, and functional switches. The fraud control switch may relate to a level of fraudulent activity. For example, if there is a high level of fraudulent activities detected, it might be determined to turn off a switch of features in an online banking environment. A release of risk communications switch may relate to one project or feature not being ready for release, but another feature is ready for release. Thus, the switch may be used to turn off the feature that is not ready, while letting the other feature be released. The functional switch may relate to turning some features on for specific customers, as discussed herein.

Figure 3:
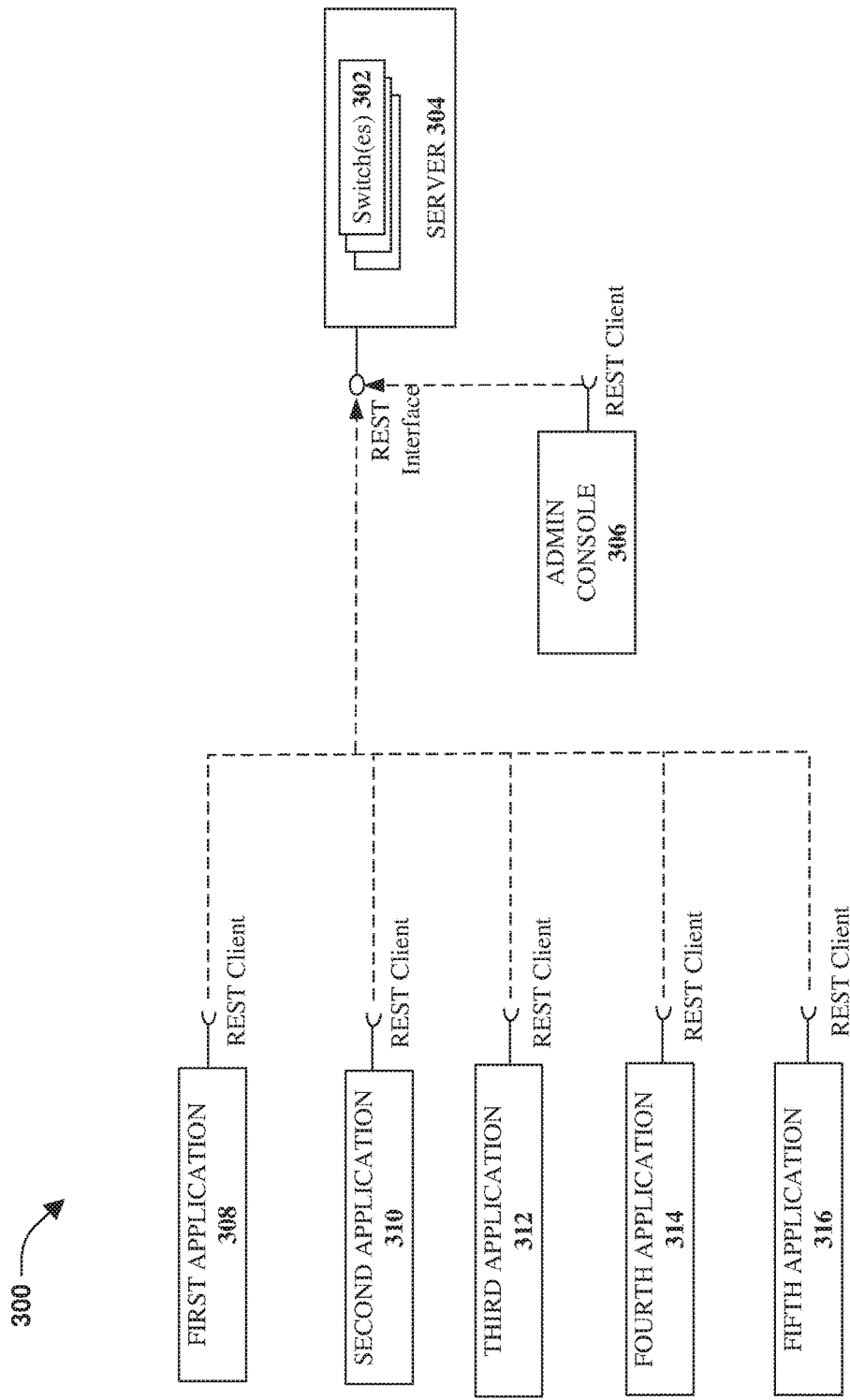
FIG. 3 illustrates an example, non-limiting implementation of a block diagram representation of a system comprising components configured to facilitate enterprise intelligent software versioning, according to an aspect.

FIG. 3 illustrates an example, non-limiting implementation of a block diagram representation of an implementation of systems 300 comprising components configured to facilitate enterprise intelligent software versioning, according to an aspect. The systems 300 may include functionality toggle switches 302 in functionality toggle server 304. According to an implementation, the functionality toggle server 304 provides representational state transfer (REST) based web services. The REST based web services provide simple REST based web services for basic Create, Retrieve, Update, Delete (CRUD) operations for the systems 300 and an admin console 306. The CRUD operations may be utilized to maintain toggles, as discussed herein. The functionality toggle server 304 may comprise no logic, but may serve a standards-based cache, such as an EhCache based map of key value pairs, according to an implementation.

For example, the admin console 306, such as a simple web client, may be included to perform CRUD operations on the functionality toggle server 304. According to an implementation, security and/or log-in access may be created for end users to access the admin console 306.

As discussed, the functionality toggle server 304 may provide a REST based web service for CRUD operations. According to some implementations, the functionality toggle server 304 may provide channel level configuration toggles. Further, the functionality toggle server 304 may provide toggle dependency mechanisms for the systems 300 for automatic propagation of changes. In an implementation, the functionality toggle server 304 may provide logging tools to help create reports on toggle/switch changes. Additionally, the applications 308 to 316 may use the provided client tool kit to communicate with the toggle server 304 for all switch value changes in their own applications. The communication method could include pulling or pushing configuration updates.

Illustrated on the left of FIG. 3 are various applications or services, labeled as a first application 308, a second application 310, a third application 312, a fourth application 314, and a fifth application 316 (although fewer or more application may be included in the systems 300). Each of the applications may be various types of services that may have switches that are hosted in the functionality toggle server 304 (or in respective functionality toggle servers associated with each application). During run time, any switch value may be changed by an authorized user using the admin console 306. Once the switch value is changed, the new switch value is consumed by the target system and the pre-programmed behavior for the new switch value will be executed in the target system.

Figure 4:
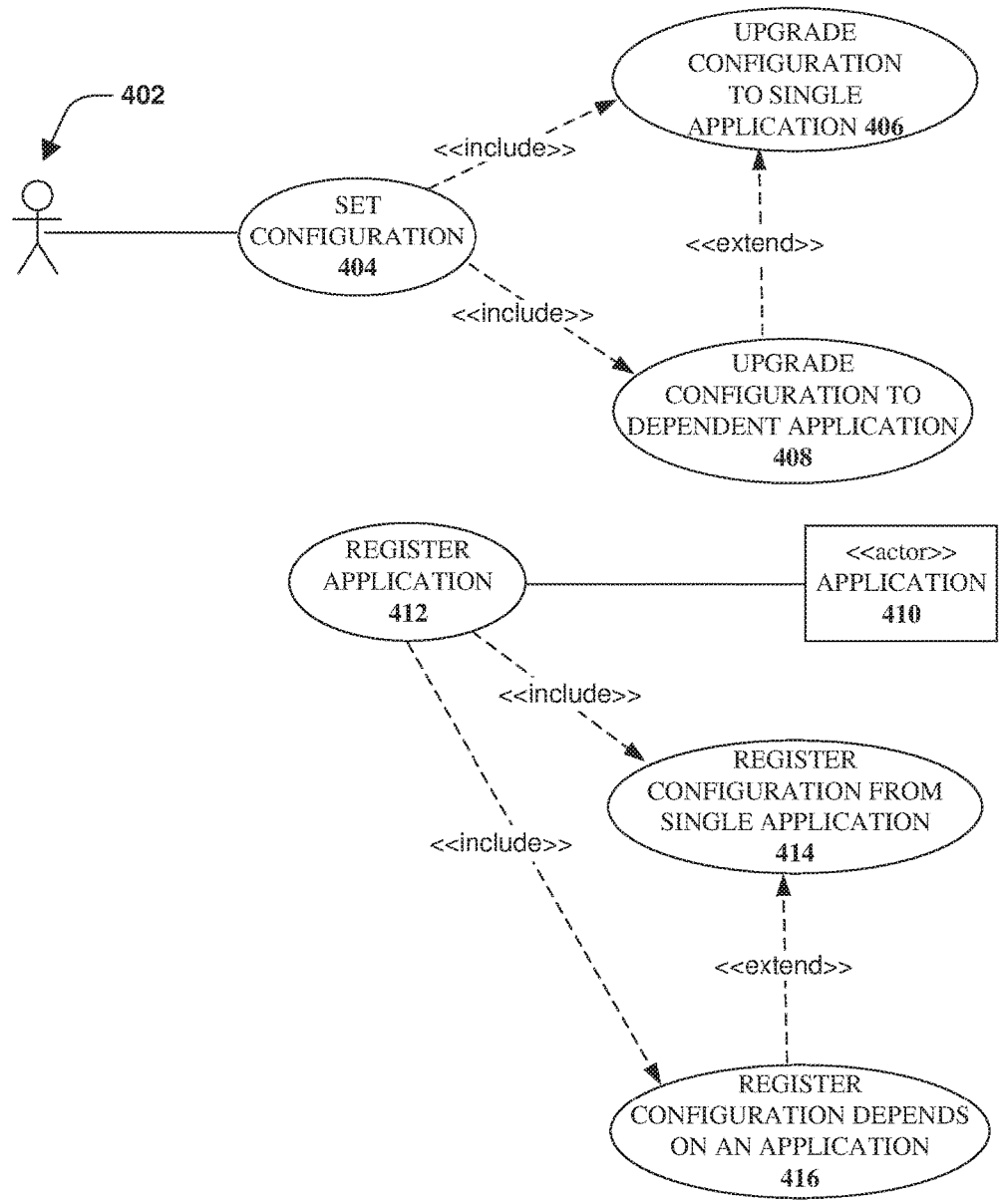
FIG. 4 illustrates example, non-limiting use case diagrams that utilize the disclosed aspects.

FIG. 4 illustrates example, non-limiting use case diagrams that utilize the disclosed aspects. An administrator operator 402 may be configured to set a configuration 404. The administrator operator 402 may be a human, as illustrated.

The set configuration 404 use case is used by the operator 402. The set configuration 404 use case may include two sub-use cases: an upgrade configuration to a single application 406 and an upgrade configuration to a dependent application 408, where 408 also extends the use case 406. For example, a switch for a new application or service, such as a bank-to-bank transfer function, may be implemented. During the initial stages of implementation, the application is only available to customers in a particular location or state, such as Wyoming. Thus, the switch may be given any name (or other identifier), such as "State Code."

During a first deployment of the application 410, a registration process 412 is implemented. As illustrated, the application 410 may be referred to as an "actor." The application 410 informs the server that a switch named "State Code" is being registered. Further, the application sets an initial value of the switch with the state name, such as Wyoming or WY, for example. The application may use a "client tool kit" to interface with the server. The client tool kit may be a standard manner of communication between the application and the server. The client tool kit may define different types of communication protocols. In an example, the communication protocol may be RISK. In another example, the communication protocol may be SOAP, or another standard xml communication protocol.

A client tool kit is provided for client applications and the client tool kit contains a standard set of communication to the toggle server. The communication may be one-way communication from the toggle server to a client application. In another example, the communication may be two-way communication where the application and the toggle server communicate with each other through the given protocol. The client tool kit includes the components and/or software classes that are used by the application. Thus, the application defines the switch and uses the client tool kit to talk to the server and/or to listen to the toggle server.

As illustrated, the register application 412 may include two use cases, which are a register configuration from a single application 414 or a register configuration that depends on an application 416, where 416 also extends the use case 414

Figure 5:
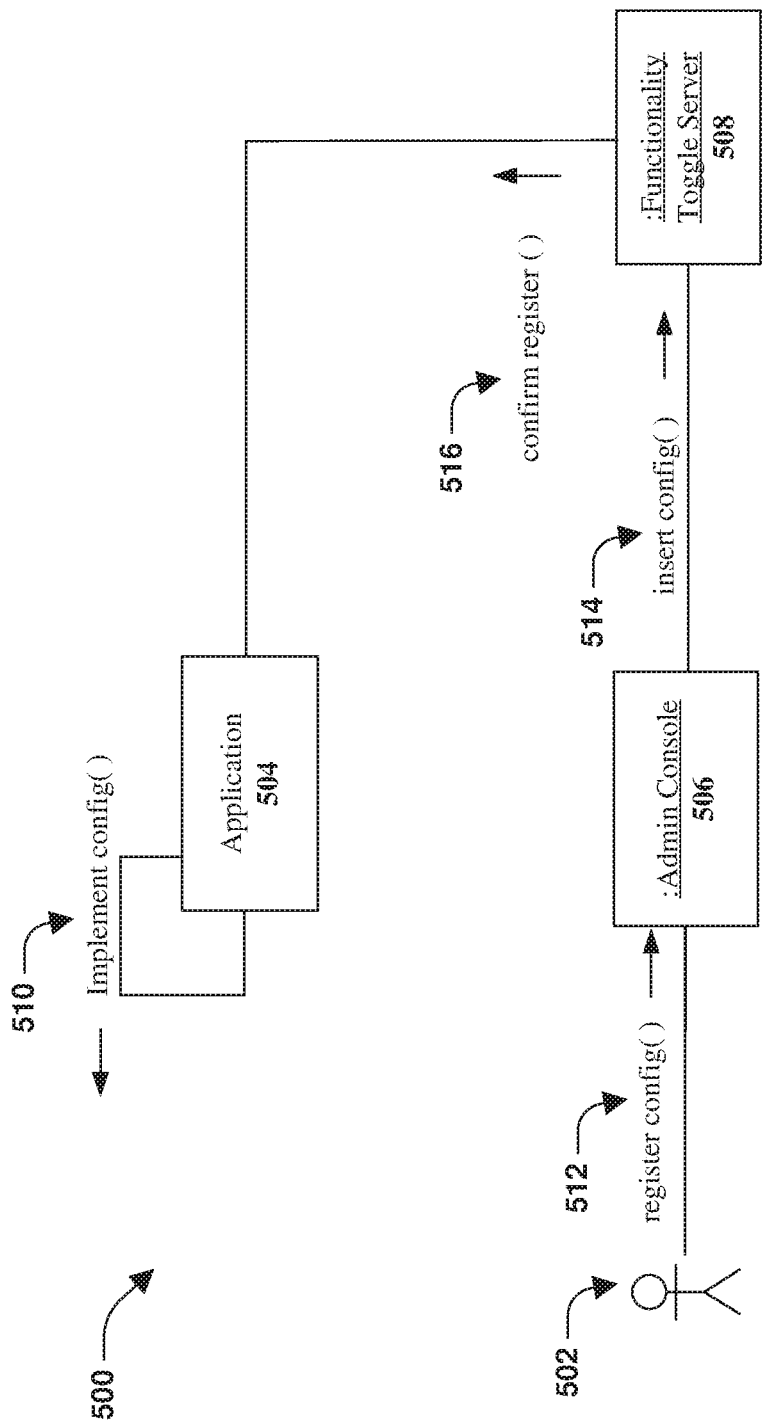
FIG. 5 illustrates an example, non-limiting representation of a register configuration from a single application, according to an aspect.

FIG. 5 illustrates an example, non-limiting representation 500 of a register configuration from a single application, according to an aspect. Illustrated are an operator 502 and an application 504. Also included are an administrative console 506 and a functionality toggle server 508. The administrative console 506 may be associated with the administrator component 102 of FIGS. 1 and 2. Further, the functionality toggle server 508 may be associated with the toggle component 112 of FIG. 1 and/or the toggle component 218 of FIG. 2.

The register configuration may depend on application collaboration messages. An implement config( ) message 510 defines and builds key/value configuration setup in the application 504. The implement config( ) message 510 may include a method of configuration updates, which may be a pull update or a push update.

A register config( ) message 512 is sent from the operator 502 to the administrator console 506. The register config( ) message 512 uses the switch configuration xml file (or a JSON file) created in 510 to feed the admin console 506.

The administrator console 506 may transmit an insert config( ) message 514 to the functionality toggle server 508. The insert config( ) message 514 may be created at about the same time as the administrator console 506 creates an entry for the application 504.

The functionality toggle server 508 may transmit a confirm register( ) message 516. For example, the functionality toggle server 508 may confirm the application 504 by calling the push or pull module.

Methods that may be implemented in accordance with the disclosed subject matter, will be better appreciated with reference to the flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 6:
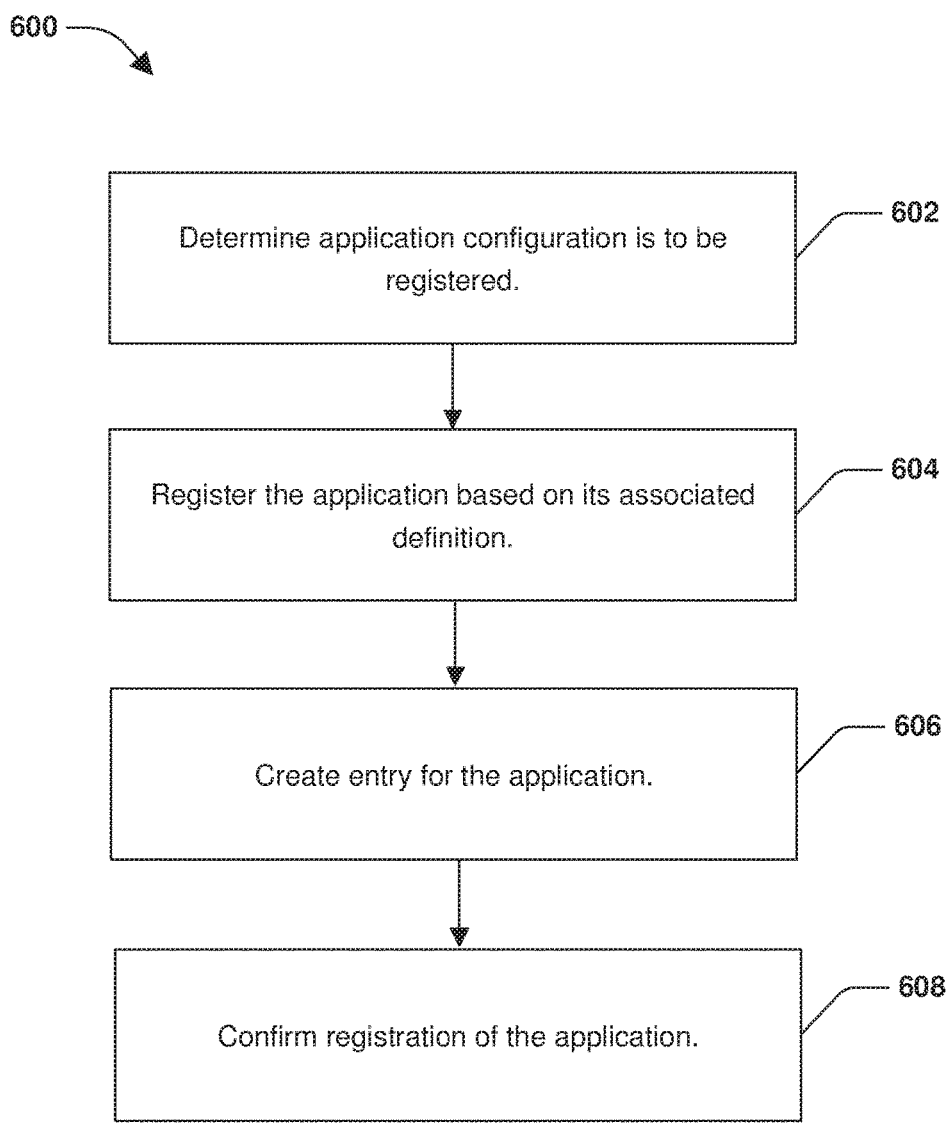
FIG. 6 illustrates an example, non-limiting method for registering an application, according to an aspect.

FIG. 6 illustrates an example, non-limiting method 600 for registering an application, according to an aspect. The method 600 in FIG. 9 may be implemented using, for example, any of the systems, such as the system 100 (of FIG. 1).

The method 600 starts at 602, when a determination that an application configuration (e.g., a switch) is to be registered. For example, an application may be built (e.g., designed) and may be associated with a definition, which may include a key and/or value configuration setup. The application may be rolled-out to all users or a subset thereof. For example, the application may include a new feature or service that may be utilized by one or more end users.

At 604, the application is registered to the toggle server based, at least in part, on the definition associated with the application and, at 606, an entry for the application may be created. Further, at 608, the registration is confirmed. For example, the registration may be confirmed based on a push message sent from the toggle server to the application. In another example, the registration may be configured based on a message pulled from the application.

Figure 7:
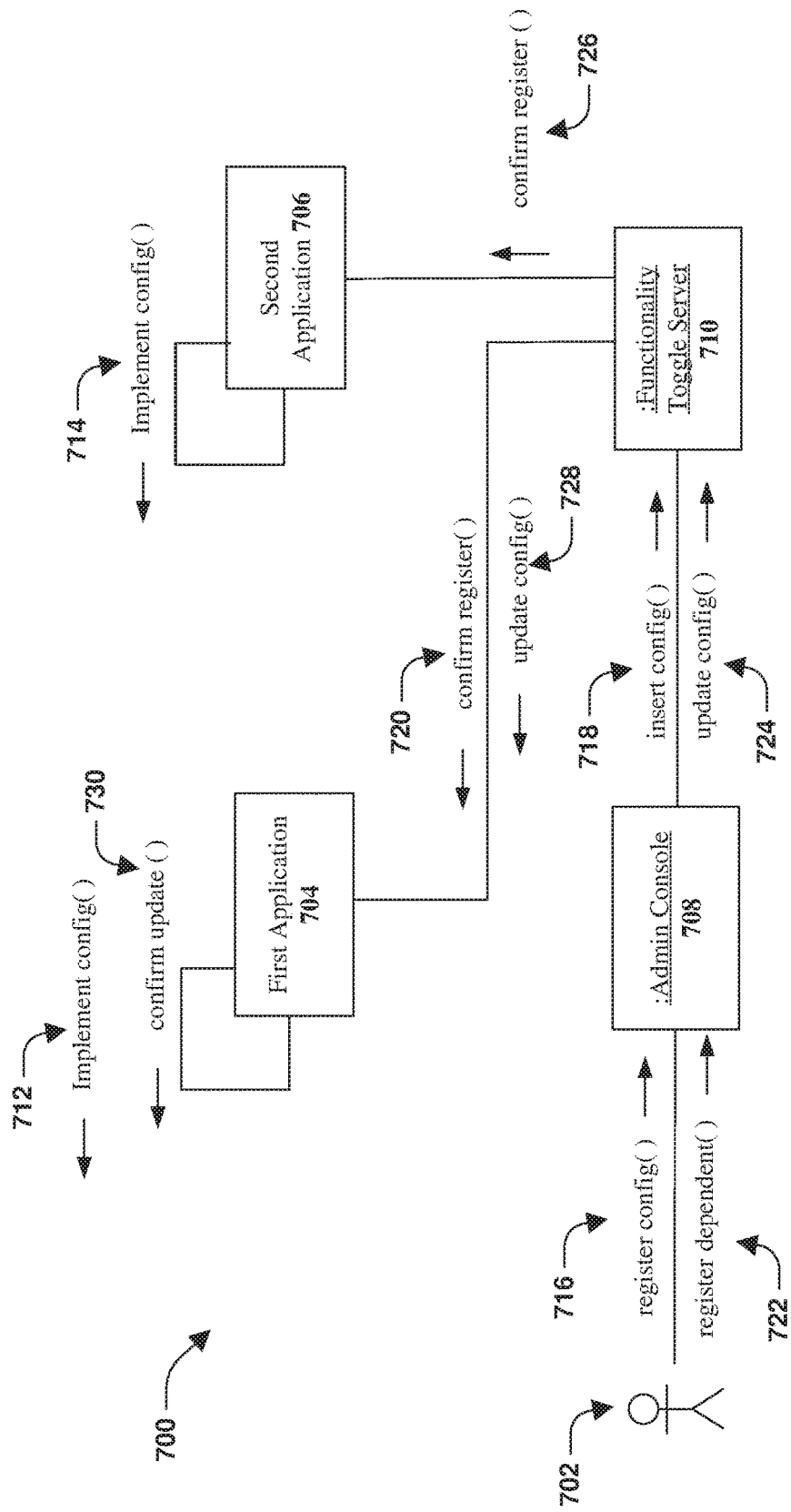
FIG. 7 illustrates an example, non-limiting representation of a register configuration that depends on a single application, according to an aspect.

FIG. 7 illustrate an example, non-limiting representation 700 of a register configuration that depends on a single application, according to an aspect. Illustrated are an operator 702, a first application 704, and a second application 706. In this example, the second application 706 has a dependency (or is linked in another manner) to the first application 704. Also included are an administrative console 708 and a functionality toggle server 710. The administrative console 708 may be associated with the administrator component 106 of FIG. 1 and/or the administrator component 206 of FIG. 2. Further, the functionality toggle server 710 may be associated with the toggle component 110 and/or the toggle component 206 of FIG. 2).

Similar to FIG. 5, the register configuration from a single application in FIG. 7 may depend on application collaboration messages. A first implement config( ) message 712 is used to create the switch configuration. The first implement config( ) message 712 may be defined and built using key/value configuration setup in the first application 704. Further, the first implement config( ) message 712 may include a method of configuration update, using pull or push communications.

A second implement config( ) message 714 is also transmitted. The second implement config( ) message 714 may be defined and built using key/value configuration setup in the second application 706. Further, the second implement config( ) message 714 may include a method of configuration update, using pull or push communications.

Based on the first implement config( ) message 712 and/or the second implement config( ) message 714, a register config( ) message 716 is transmitted from the operator 702 to the administrator console 708. The register config( ) message 714 may be created at about the same time as the operator 702 registers the first application 704 and may be based on a definition of the first application 704.

An insert config( ) message 718 is transmitted from the administrator console 708 to the functionality toggle server 710. The insert config( ) message 718 may be created by the administrator console 708 at substantially the same time as the entry for the first application 704 is created.

The functionality toggle server 710 transmits a confirm register( ) message 720 to the first application 704. Through the confirm register( ) message 720, the functionality toggle server 710 confirms the first application 704 by calling the push or pull module.

The operator 702 also transmits to the administrator console 708 a register dependent( ) message 722. In this case, the operator 702 registers the second application 706 based on its dependency definition. For example, the dependency definition indicates the second application 708 is dependent on (or is otherwise lined to) the first application 704.

The administrator console 708 transmits an update config( ) message 724 to the functionality toggle server 710. The update config( ) message 724 is created when the administrator console 708 creates the entry for the second application 706. During the entry creation, the second application 706 is added as a dependent application in a configuration of the first application 704.

The functionality toggle server 710 transmits a confirm register( ) message 726 to the second application 706. For example, the functionality toggle server 710 confirms the second application 706 by calling the push or pull module.

An update config( ) message 728 is also sent from the functionality toggle server 710 to the first application 704. The update config( ) message 728 notifies the first application 704 that there is a dependent application (e.g., the second application 706).

A confirm update( ) message 730 is transmitted by the first application 704. The confirm update( ) message 730 indicates that the first application 704 added the second application 706 as a dependent application in a property file associated with the first application 704.

Figure 8:
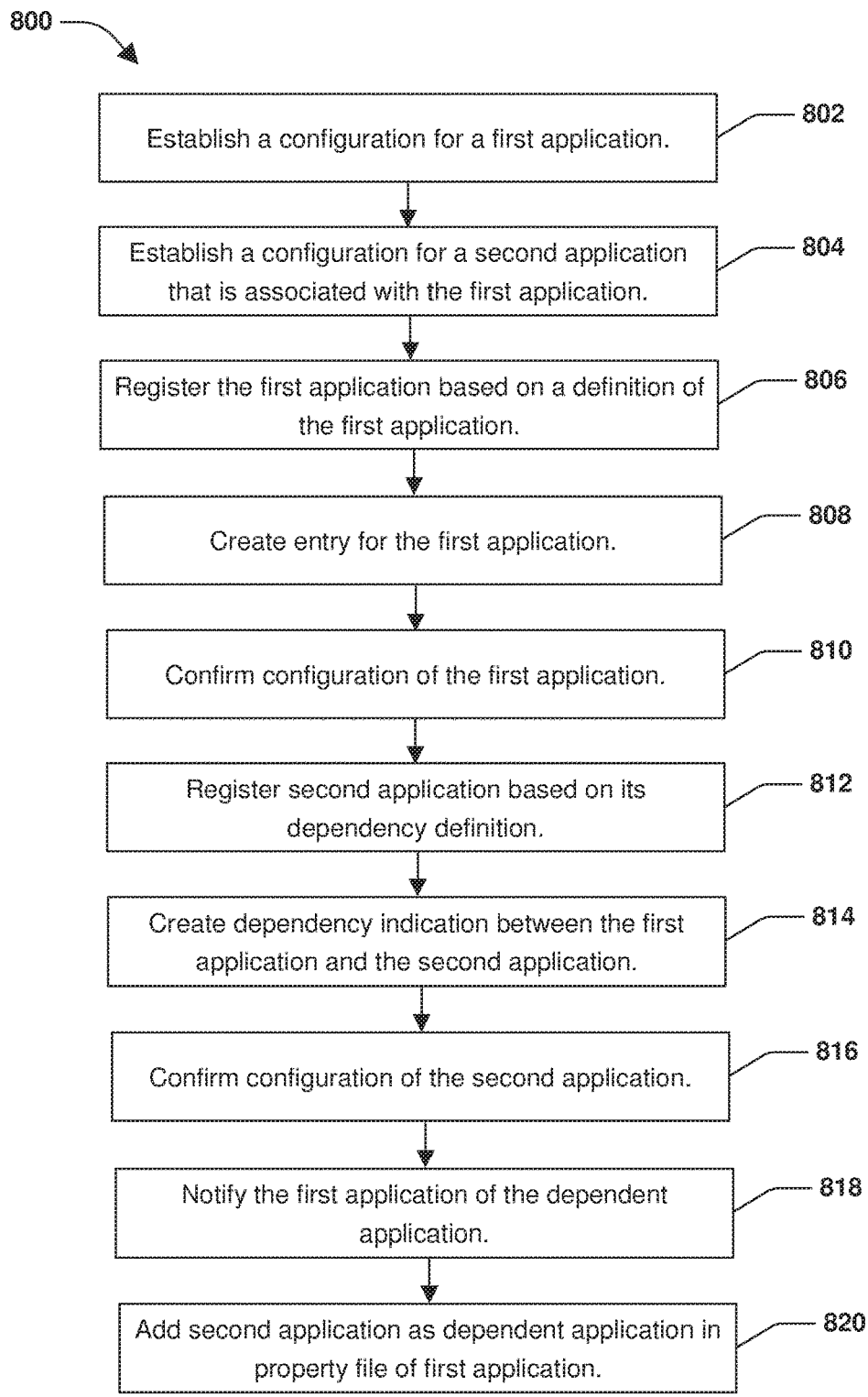
FIG. 8 illustrates an example, non-limiting method for registering a first application having dependency on at least a second application, according to an aspect.

FIG. 8 illustrates an example, non-limiting method 800 for registering a first application having dependency on at least a second application, according to an aspect. The method 800 in FIG. 8 may be implemented using, for example, any of the systems, such as the system 200 (of FIG. 2).

The method 800 starts, at 802, when a configuration for a first application is established. The configuration may include a definition based on a key and/or value configuration in the first application. At 804, a configuration for a second application, associated with the first application may be established. For example, the configuration for the second application may be defined and built as a key and/or value configuration based on an association or relationship with the first application. In an example, the relationship may be a dependency relationship.

At 806, the first application is registered based on the definition associated with the first application. At 808, an entry for the first application is created and, at 810, configuration of the first application is confirmed. The confirmation may include sending a push message to the application. In another example, the confirmation may include pulling a confirmation message from the application.

At 812, the second application is registered based on its dependency definition. A dependency indication between applications is created, at 814. The dependency indication creation may include creating an entry for the second application and adding the second application as a dependent application in a configuration of the first application.

At 816, a configuration of the second application is confirmed. The confirmation may be conducted through a push message (or push module). Alternatively, the confirmation may be conducted through a pull message (or push module). The dependency relationship between the first application and the second application may be established in the toggle server.

Figure 9:
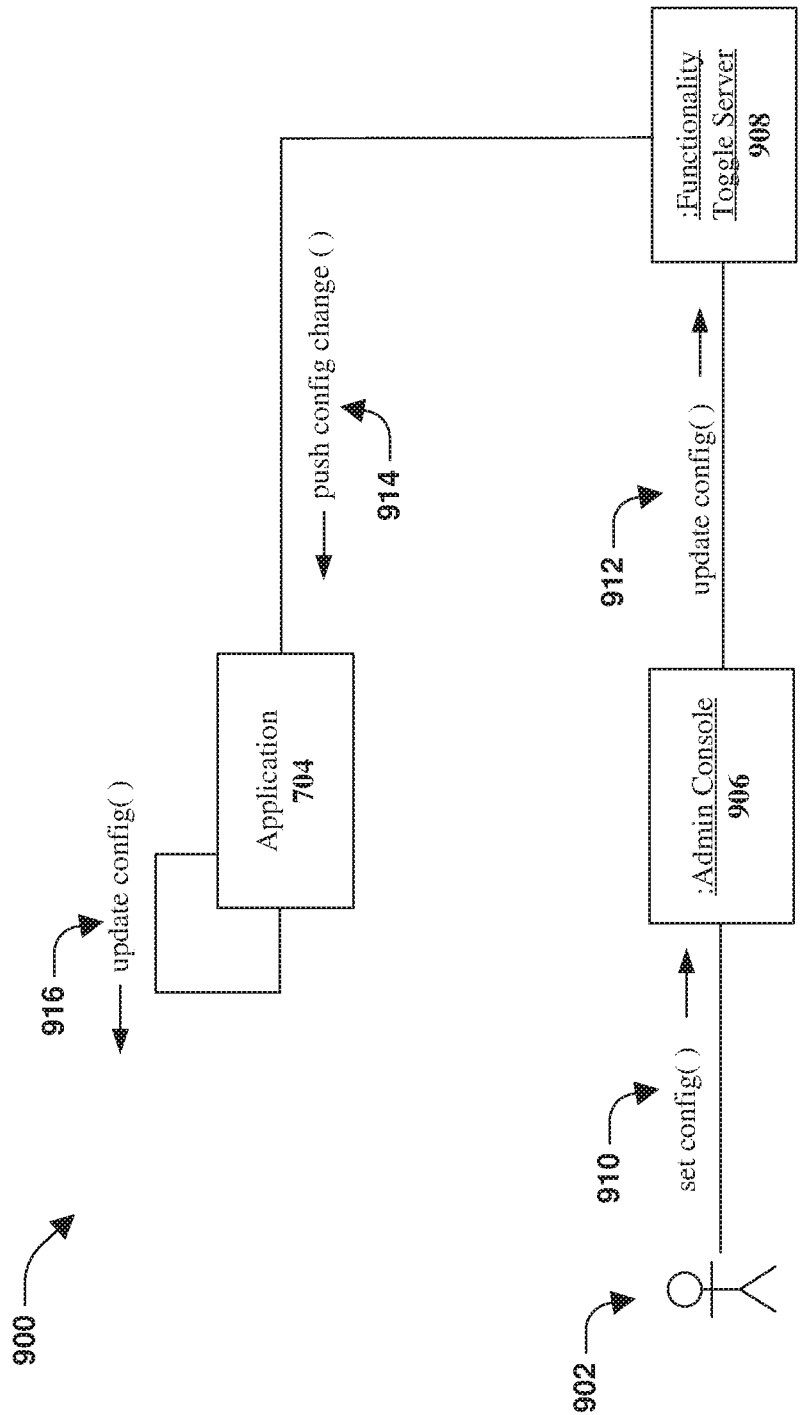
FIG. 9 illustrates an example, non-limiting representation of an update configuration to a single application, according to an aspect.

FIG. 9 illustrate an example, non-limiting representation 900 of an update configuration to a single application, according to an aspect. Similar to FIG. 5, included in the representation of FIG. 9 are an operator 902 and an application 904. Also included are an administrative console 906 and a functionality toggle server 908. The administrative console 906 may be associated with the administrator component 106 of FIG. 1 and/or the administrator component 206 of FIG. 2. Further, the functionality toggle server 908 may be associated with the toggle component 112 of FIG. 1 and/or the toggle component 218 of FIG. 2).

In a similar manner as the register configurations discussed with respect to FIG. 5 and FIG. 7, the update configuration may depend on application collaboration messages. The operator 904 transmits a set config( ) message 910 to the administrative console 906. The set config( ) message 910 may be sent at about the same time as (or any time after) the operator 904 sets a new value to the configuration defined for the application 904.

An update config( ) message 912 is transmitted by the administrative console 906 to the functionality toggle server 908. The update config( ) message 912 may be created and sent at about the same times as (or after) the administrative console 906 updates the new configuration value.

The functionality toggle server 908 conveys a push config change( ) message 914 to the application 904. The push config change( ) message 914 may be sent when the functionality toggle server 908 pushes the new value of the configuration key to the application 904. According to some implementations, the push config change( ) message 914 may instead be a pull config change( ) message. For example, the message may be a pull from the application 904 if the pull was the initial definition.

An update config( ) message 916 is transmitted after the push or pull config change( ) message is received from the functionality toggle server 908. The update config( ) message 916 indicates the application 904 has updated its internal configuration based on the new value received.

Figure 10:
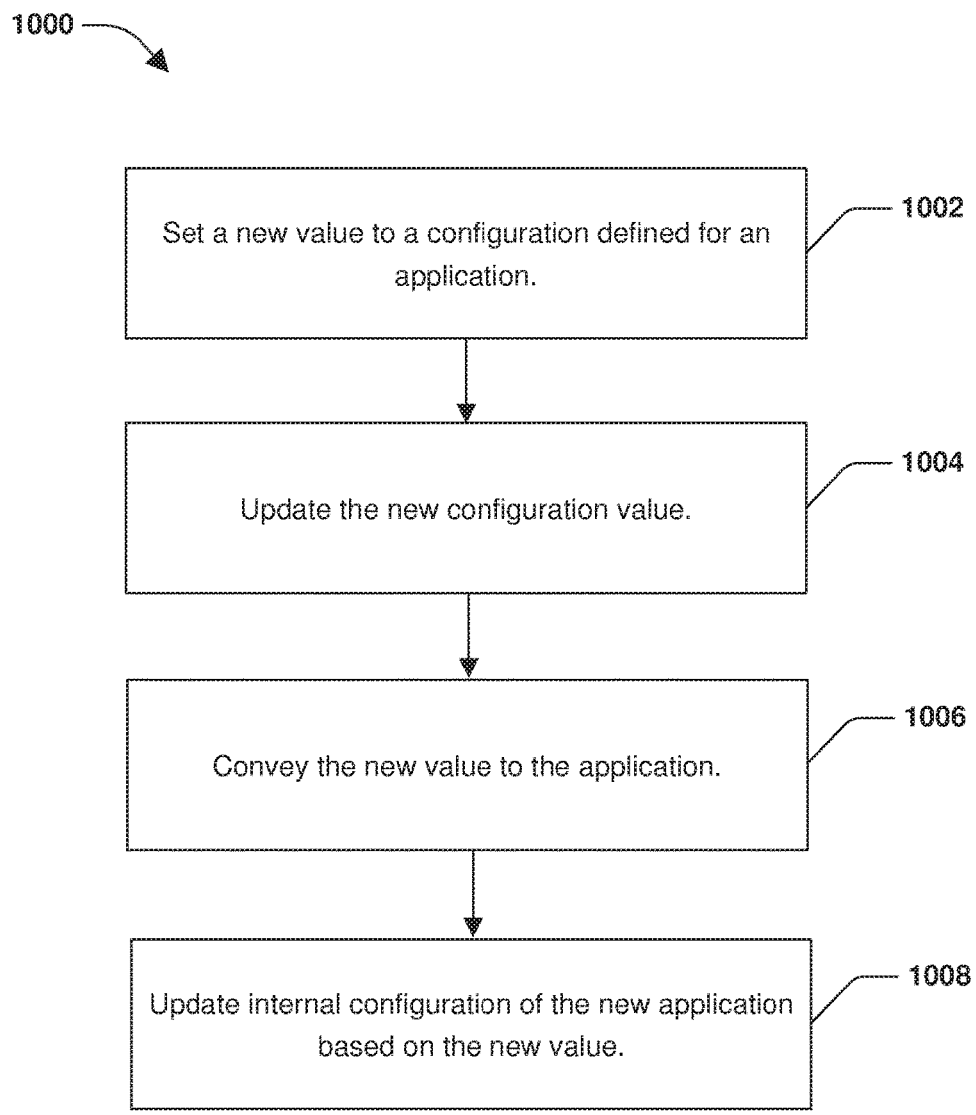
FIG. 10 illustrates an example, non-limiting embodiment of a method for updating a configuration to a single application, according to an aspect.

FIG. 10 illustrates an example, non-limiting embodiment of a method 1000 for updating a configuration to a single application, according to an aspect. The method 1000 in FIG. 10 may be implemented using, for example, any of the systems, such as the system 200 (of FIG. 2).

At 1002, a new value to a configuration is defined for an application. The new value may be a change to an initial value or a change to a previously updated value (e.g., the value was changed at least once before). The new value may be updated based on various criteria, including a defined interval, monitoring of log events, and based on other considerations.

At 1004, the new configuration value is updated in the toggle server, which may maintain a mapping between the application and the configuration value. The new value of the configuration key is transmitted to the application, at 1006. For example, the new value may be pushed to application. In another example, the new value may be pulled from the application in the case where the new value is the initial definition. An internal configuration of the application is updated, at 1008, based on the new value.

Figure 11:
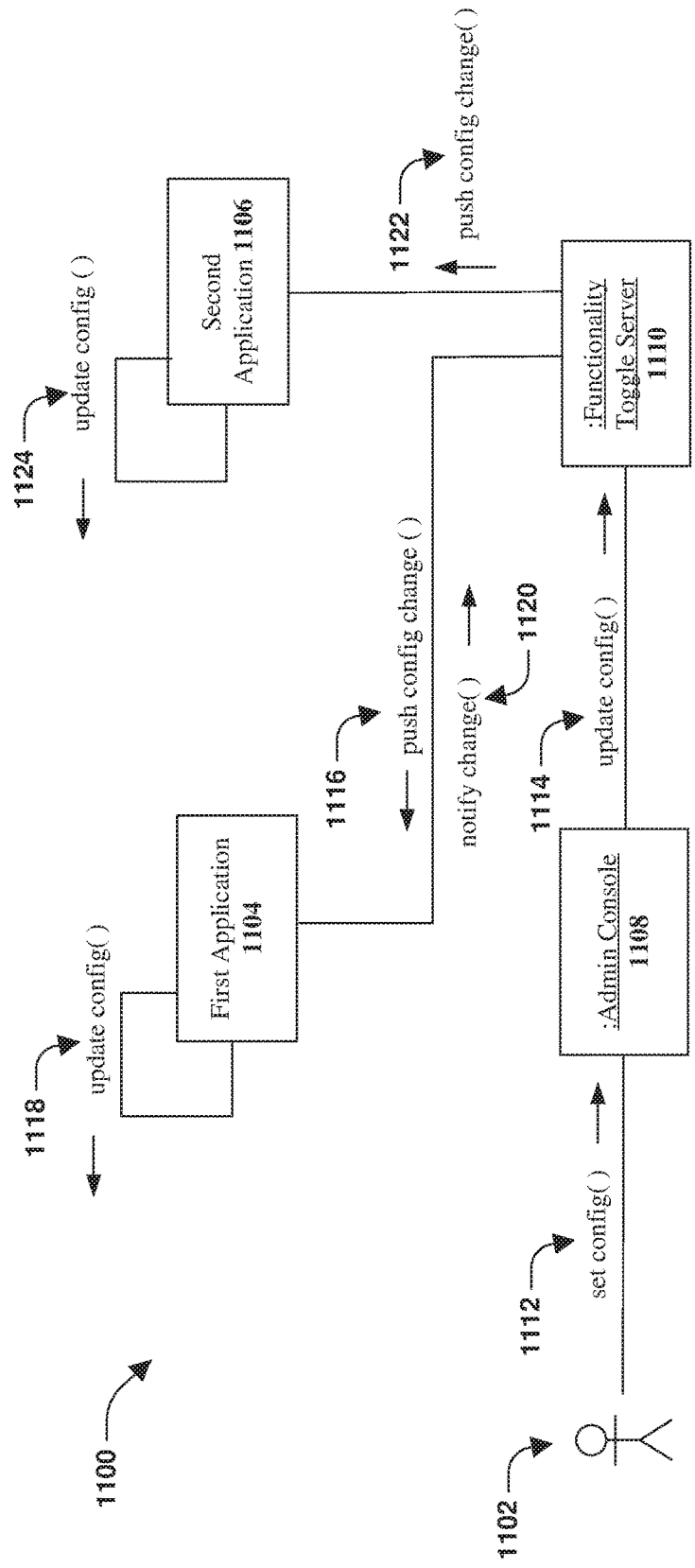
FIG. 11 illustrates an example, non-limiting representation of an update configuration to a dependent application, according to an aspect.

FIG. 11 illustrates an example, non-limiting representation 1100 of an update configuration to a dependent application, according to an aspect. Included are an operator 1102, a first application 1104, and a second application 1106. In this example, the second application 1106 has a dependency (or is linked in another manner) to the first application 1104. Also included are an administrative console 1108 and a functionality toggle server 1110. The administrative console 1108 may be associated with the administrator component 106 of FIG. 1 and/or the administrator component 206 of FIG. 2. Further, the functionality toggle server 1110 may be associated with the toggle component 112 of FIG. 1 and/or the toggle component 218 of FIG. 2).

Similar to FIG. 9, the update configuration to a dependent application may depend on application collaboration messages. A set config( ) message 1112 may be initiated by the operator 1102. For example, the operator 1102 may set a new value to the configuration defined for the first application 1104.

The administrative console 1108 updates a new configuration value based on the set config( ) message 1112 received. Further, the administrative console 1108 sends an update config( ) message 1114 to the functionality toggle server 1110.

A push config change( ) message 1116 (or alternatively a pull config change( ) message) is sent to the first application 1104 from the functionality toggle server 1110. The (pull or) push config change( ) message 1116 includes the new value to the configuration key and is pushed to (or pulled from) the first application 1104.

The first application 1104 sends an update config( ) message 1118, which indicates the first application 1104 has updated its internal configuration based on the new value. In addition, the first application 1104 sends a notify change( ) message 1120 to the functionality server 1110. The notify change( ) message 1120 notifies the functionality toggle server 1110 that the configuration updates have been processed by the first application 1104.

A push config change( ) message 1122 (or alternatively a pull config change( ) message) is sent to the second application 1106 from the functionality toggle server 1110. The (pull or) push config change( ) message 1122 includes the new value of the config key. The second application 1106 sends an update config( ) message 1124, which indicates the second application 1106 has updated its internal configuration based on the new value.

Figure 12:
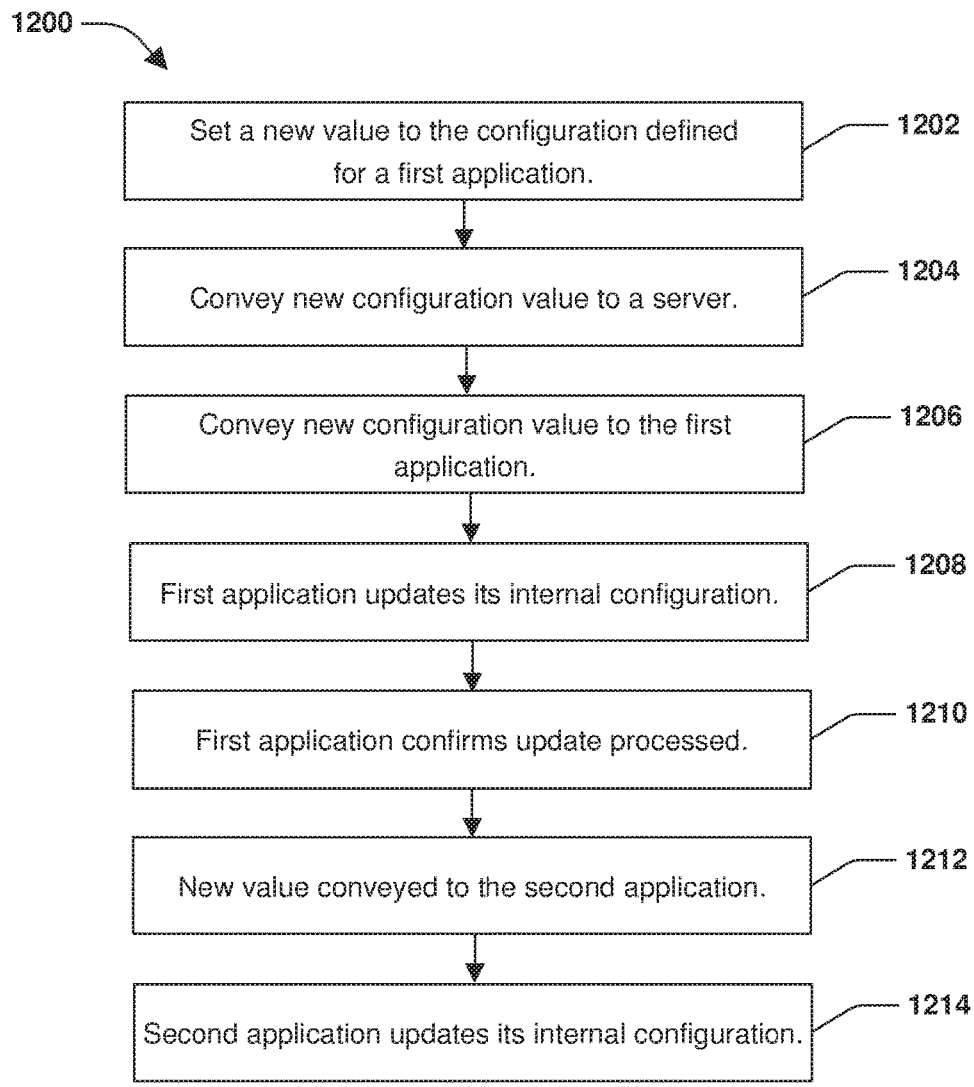
FIG. 12 illustrates an example, non-limiting implementation of a method for updating a configuration to a dependent application, according to an aspect.

FIG. 12 illustrates an example, non-limiting implementation of a method 1200 for updating a configuration to a dependent application, according to an aspect. The method 1200 in FIG. 12 may be implemented using, for example, any of the systems, such as the system 100 (of FIG. 1).

At 1202, a new value to the configuration for a first application is defined. The new value may be defined based on received input (e.g., manually entered by an operator to the admin console), based on an inference, based on a defined criteria (such as a defined interval), or based on other considerations.

At 1204, the new configuration value is conveyed to the toggle server that maintains a mapping between applications, switches, and values. The new configuration value to the configuration key is conveyed to the first application, at 1206. In an example, the new configuration value may be pushed to the first the first application.

The first application updates its internal configuration, at 1208, based on the new value. At 1210, the first application confirms the update has been processed. For example, the first application may inform the server that the update is completed.

At 1212, the new value of the configuration key is conveyed to the second application. For example, the new value of the configuration key may be pushed to the second application. In another example, the new value of the configuration key may be pulled from the server. At about the same time as the new value is received, at 1214, the second application updates its internal configuration based on the new value.

According to an implementation, when a switch value decision is made, and the value is changed, the applications that use the switch are automatically updated with the new value. In some cases, numerous applications (e.g., hundreds) of applications may subscribe to the switch. Thus, those numerous applications may automatically adjust their behavior of that piece of functioning that pertains to the switch. Further, subscription to a switch is not mandatory. Instead, each application (or components associated with the application) may make a determination whether to subscribe to the new switch or to not subscribe to the new switch. According to some implementations, information about the new switch is published so that the potential impact to each affected application may be analyzed and the decision to subscribe (or not subscribe) to the new switch may be made. Thus, any application may define its own switch definition and then register the switch in the toggle server and that switch definition may be selectively used by (and automatically applied to) one or more other applications.

Figure 13:
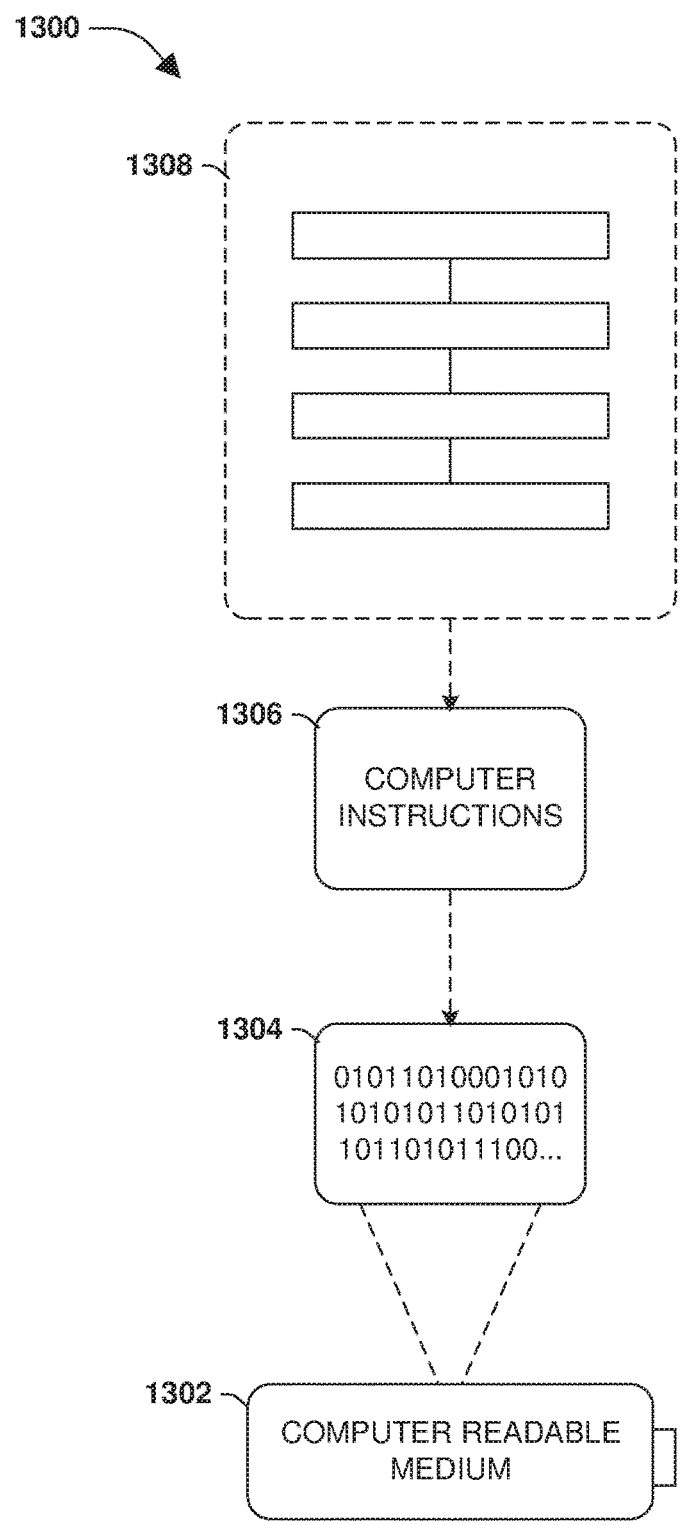
FIG. 13 illustrates an example, non-limiting computer-readable medium or computer-readable device including processor-executable instructions configured to embody one or more of the aspects set forth herein.

One or more implementations include a computer-readable medium including processor-executable instructions configured to implement one or more embodiments presented herein. An embodiment of a computer-readable medium or a computer-readable device devised in these ways is illustrated in FIG. 13, wherein an implementation 1300 includes a computer-readable medium 1302, such as a CD-R, DVD-R, flash drive, a platter of a hard disk drive, and so forth, on which is encoded computer-readable data 1304. The computer-readable data 1304, such as binary data including a plurality of zero's and one's as illustrated, in turn includes a set of computer instructions 1306 configured to operate according to one or more of the principles set forth herein.

In the illustrated embodiment 1300, the processor-executable computer instructions 1306 may be configured to perform a method 1308, such as the method 1000 of FIG. 10 and/or the method 1200 of FIG. 12, for example. In another embodiment, the processor-executable instructions 1304 may be configured to implement a system, such as the system 200 of FIG. 2 and/or the system 100 of FIG. 1, for example. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 14:
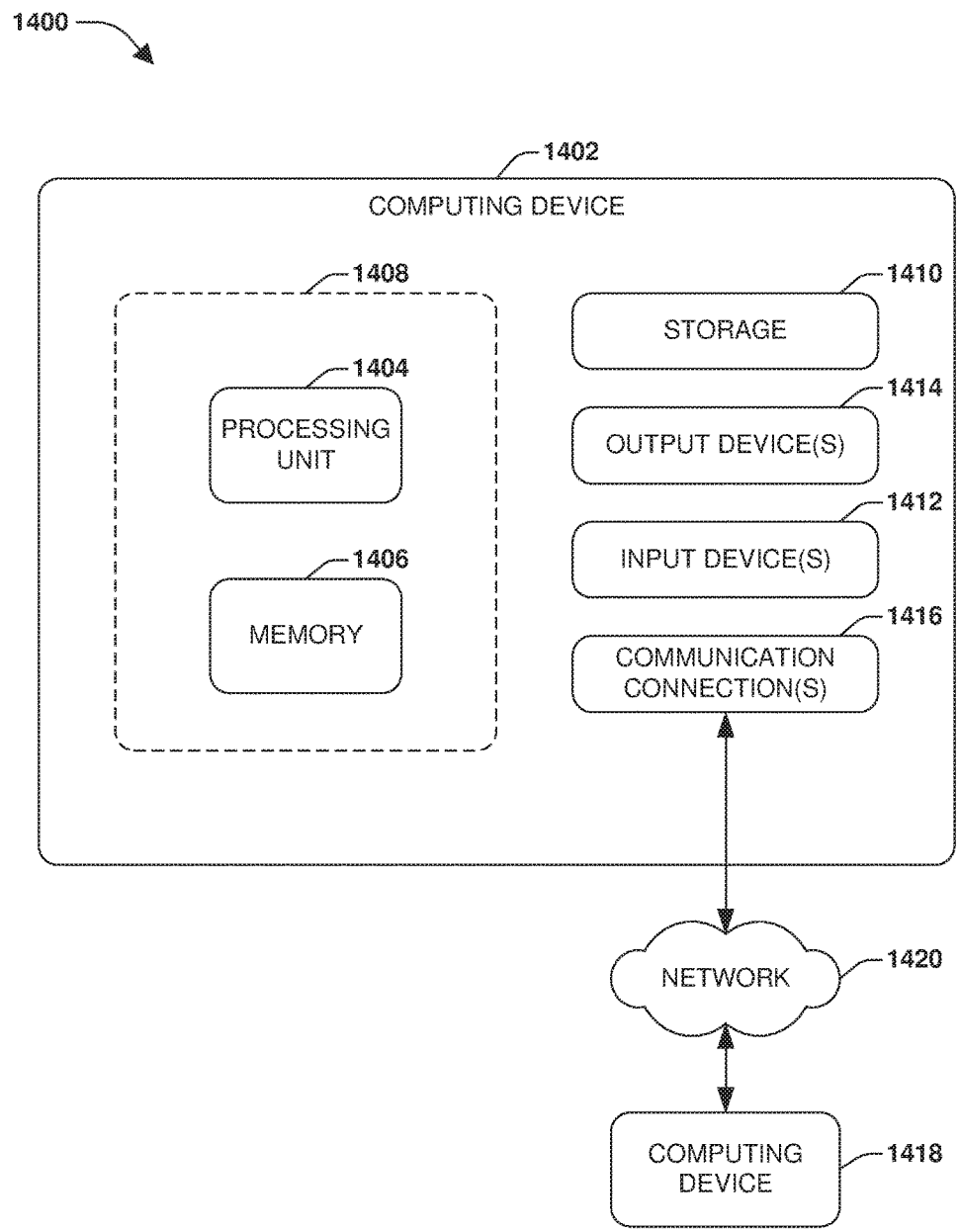
FIG. 14 illustrates an example, non-limiting computing environment where one or more of the aspects set forth herein are implemented, according to one or more embodiments.

FIG. 14 and the following discussion provide a description of a suitable computing environment to implement embodiments of one or more of the aspects set forth herein. The operating environment of FIG. 14 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 14 illustrates a system 1400 that may include a computing device 1402 configured to implement one or more embodiments provided herein. In one configuration, the computing device 1402 may include at least one processing unit 1404 and at least one memory 1406. Depending on the exact configuration and type of computing device, the at least one memory 1406 may be volatile, such as RAM, nonvolatile, such as ROM, flash memory, etc., or a combination thereof. This configuration is illustrated in FIG. 14 by dashed line 1408.

In other embodiments, the device 1402 may include additional features or functionality. For example, the device 1402 may include additional storage such as removable storage or non-removable storage, including, but not limited to, magnetic storage, optical storage, etc. Such additional storage is illustrated in FIG. 14 by storage 1410. In one or more embodiments, computer readable instructions to implement one or more embodiments provided herein are in the storage 1410. The storage 1410 may store other computer readable instructions to implement an operating system, an application program, etc. Computer readable instructions may be loaded in the at least one memory 1406 for execution by the at least one processing unit 1404, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The device 1402 may include input device(s) 1412 such as keyboard, mouse, pen, voice input device, touch input device, infrared cameras, video input devices, or any other input device. Output device(s) 1414 such as one or more displays, speakers, printers, or any other output device may be included with the device 1402. The input device(s) 1412 and the output device(s) 1414 may be connected to the device 1402 via a wired connection, wireless connection, or any combination thereof. In one or more embodiments, an input device or an output device from another computing device may be used as the input device(s) 1412 and/or the output device(s) 1414 for the device 1402. Further, the device 1402 may include communication connection(s) 1416 to facilitate communications with one or more other devices, illustrated as a computing device 1418 coupled over a network 1420.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
    a first tool kit component that registers a first application with a toggle component, the registration includes a switch definition for a switch used by the first application; and
    an administrator component that receives a change to a switch value, wherein the toggle component updates the switch definition to reflect the change to the switch value,
    wherein the first tool kit component receives, from the toggle component, the change to the switch value wherein the reception is based at least in part on parameters of the change to the switch value and implements the change to the switch value at the first application,
    wherein components of the system are implemented using at least one hardware processor.

2. The system of claim 1, wherein the toggle component is a switch server that is a central repository for a set of switches, which includes the switch, used by the first application.

3. The system of claim 1, wherein the administrator component is a graphical user interface application.

4. The system of claim 1, wherein the toggle component sends the change to the switch value to a second application based on a determination that the second application is dependent on the first application, and a second tool kit component associated with the second application facilitates implementation of the change at the second application.

5. The system of claim 4, wherein the toggle component receives a confirmation from the second application, the confirmation indicates the change has been implemented at the second application.

6. The system of claim 4, wherein the toggle component automatically changes the switch value based on defined criteria and the second tool kit component facilitates implementation of the change to the switch value at the second application, the defined criteria includes a defined interval.

7. The system of claim 4, wherein the defined criteria comprise a quantitative value.

8. The system of claim 1, wherein the toggle component automatically changes the switch value based on defined criteria, wherein the first tool kit component facilitates implementation of the change to the switch value at the first application.

9. The system of claim 1, wherein the toggle component disables the switch based on an indication that the feature should be deactivated.

10. The system of claim 1, wherein the toggle component reverts the switch to a previous switch value based on an indication that the feature should be deactivated.

11. The system of claim 1, wherein the switch value comprises an implementation rule.

12. A method, comprising:
    registering, by a system, a first application, the registration includes a switch definition for a switch used by the first application and a configuration defined for the switch;
    receiving, by a system comprising a processor, a change value for the configuration defined for the switch, wherein the switch is used by the first application;
    conveying, by the system, the change value for the switch to the first application, wherein the conveying is based at least in part on parameters of the change value; and
    updating, by the system, a first internal configuration of the first application based on the change value.

13. The method of claim 12, wherein the receiving change value comprises receiving a change to a switch definition at an administrator console.

14. The method of claim 12, the method further comprising:
    determining, by the system, the first application has a dependency relationship with a second application;
    conveying, by the system, the change value to the second application; and
    updating, by the system, a second internal configuration of the second application based on the change value and the dependency relationship.

15. The method of claim 14, before the conveying the change value to the second application, the method further comprising receiving an indication from the first application that the first internal configuration has been updated.

16. The method of claim 14, further comprising:
    notifying, by the system, the first application of the dependency indication between the first application and the second application; and
    adding, by the system, the second application as a dependent application in a property file of the first application.

17. A computer-readable storage device storing executable instructions that, in response to execution, cause a system comprising a processor to perform operations, comprising:
    registering a first application, the registration includes a switch definition for a switch used by the first application and a configuration defined for the switch;
    establishing a change value for the switch;
    conveying the change value to the first application wherein the conveyance is based at least in part on parameters of the change value; and
    updating an internal configuration of the first application based on the change value, wherein the updating is based at least in part on parameters of the change value.

18. The computer-readable storage device of claim 17, the operations further comprising:
    determining the first application has a dependent relationship with a second application that includes at least one server;
    conveying the change value to the second application; and
    updating another internal configuration of the second application based on the change value comprising updating the at least one server.

19. The computer-readable storage device of claim 17, wherein the change value is defined based on an input received from the first application.

20. The computer-readable storage device of claim 17, wherein the change value comprises an implementation rule.

* * * * *